US012638230B2

(12) United States Patent
Jeon

(10) Patent No.: US 12,638,230 B2
(45) Date of Patent: May 26, 2026

(54) REFRIGERATOR

(71) Applicant: LG ELECTRONICS INC., Seoul (KR)

(72) Inventor: Ki Bum Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 63 days.

(21) Appl. No.: 18/712,865

(22) PCT Filed: Oct. 14, 2022

(86) PCT No.: PCT/KR2022/015593
§ 371 (c)(1),
(2) Date: May 23, 2024

(87) PCT Pub. No.: WO2023/101205
PCT Pub. Date: Jun. 8, 2023

(65) Prior Publication Data

US 2025/0020387 A1 Jan. 16, 2025

(30) Foreign Application Priority Data

Dec. 1, 2021 (KR) ........................ 10-2021-0170428

(51) Int. Cl.
*F25D 23/02* (2006.01)
*E05D 11/06* (2006.01)

(52) U.S. Cl.
CPC ............ *F25D 23/028* (2013.01); *E05D 11/06* (2013.01); *E05Y 2201/638* (2013.01); *E05Y 2900/31* (2013.01); *F25D 2323/023* (2013.01); *F25D 2323/024* (2013.01)

(58) Field of Classification Search
CPC ............. F25D 2323/024; F25D 23/028; F25D 2323/023; E05D 11/06; E05D 11/105; E05Y 2900/31; E05Y 2201/224; E05Y 2201/638
See application file for complete search history.

(56) References Cited

U.S. PATENT DOCUMENTS 10,451,332 B2 * 10/2019 Yi ........................... E05D 7/081
2014/0145576 A1 * 5/2014 White ................... E05F 1/1253 312/319.1
2014/0232250 A1 * 8/2014 Kim ...................... F25D 23/028 312/292
2014/0232251 A1 * 8/2014 Kim ...................... F25D 23/025 312/405

(Continued)

FOREIGN PATENT DOCUMENTS

CN 105546912 A 5/2016
CN 106968538 A * 7/2017 ............... E05D 5/02

(Continued)

*Primary Examiner* — Hiwot E Tefera
(74) *Attorney, Agent, or Firm* — Birch, Stewart, Kolasch & Birch, LLP

(57) ABSTRACT

According to the present disclosure, in a refrigerator having a double door in which a first door and a second door are installed to overlap each other, a stopper limiting a rotation angle of the second door is integrally provided in a second hinge assembly. Accordingly, the components of the hinge assembly are minimized, and thus management and assembly work may be easily performed.

12 Claims, 14 Drawing Sheets

(56) References Cited

U.S. PATENT DOCUMENTS

| | | | | |
|---|---|---|---|---|
| 2015/0260445 | A1* | 9/2015 | Kim | E05D 7/04 312/405 |
| 2015/0260447 | A1* | 9/2015 | Kim | F25D 27/005 312/405 |
| 2018/0266155 | A1* | 9/2018 | Fleig | F25D 23/028 |
| 2020/0024880 | A1* | 1/2020 | Liu | F25D 23/028 |
| 2020/0025438 | A1* | 1/2020 | Liu | F25D 23/025 |
| 2020/0408015 | A1* | 12/2020 | Manara | E05D 11/105 |
| 2023/0042214 | A1* | 2/2023 | Ham | E05D 7/04 |

FOREIGN PATENT DOCUMENTS

| | | | | |
|---|---|---|---|---|
| CN | 113338739 | A * | 9/2021 | F25D 23/028 |
| KR | 10-2004-0056345 | A | 6/2004 | |
| KR | 10-2007-0116504 | A | 12/2007 | |
| KR | 10-2015-0106311 | A | 9/2015 | |

* cited by examiner

[FIG.1]
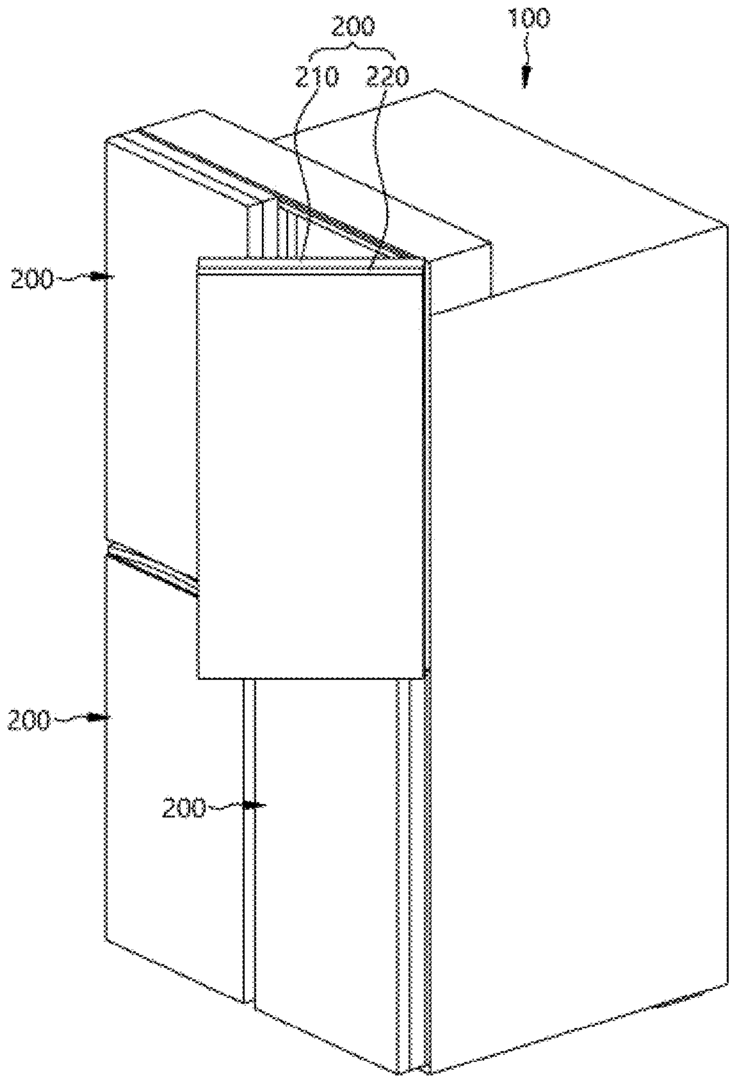

[FIG.2]
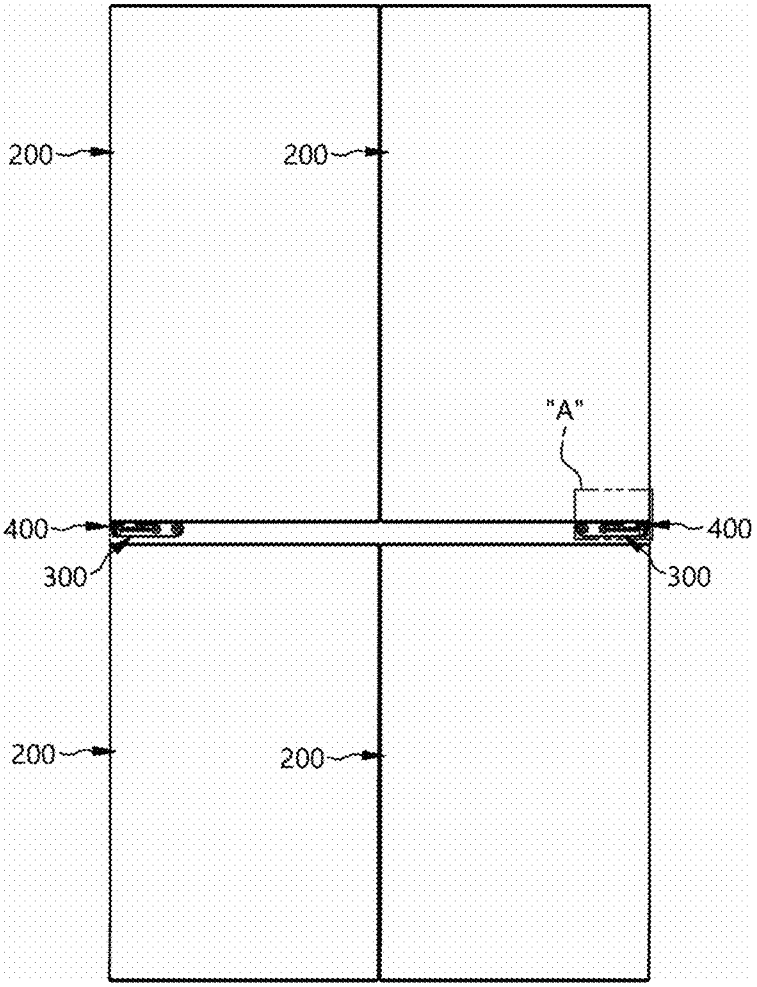

[FIG.3]
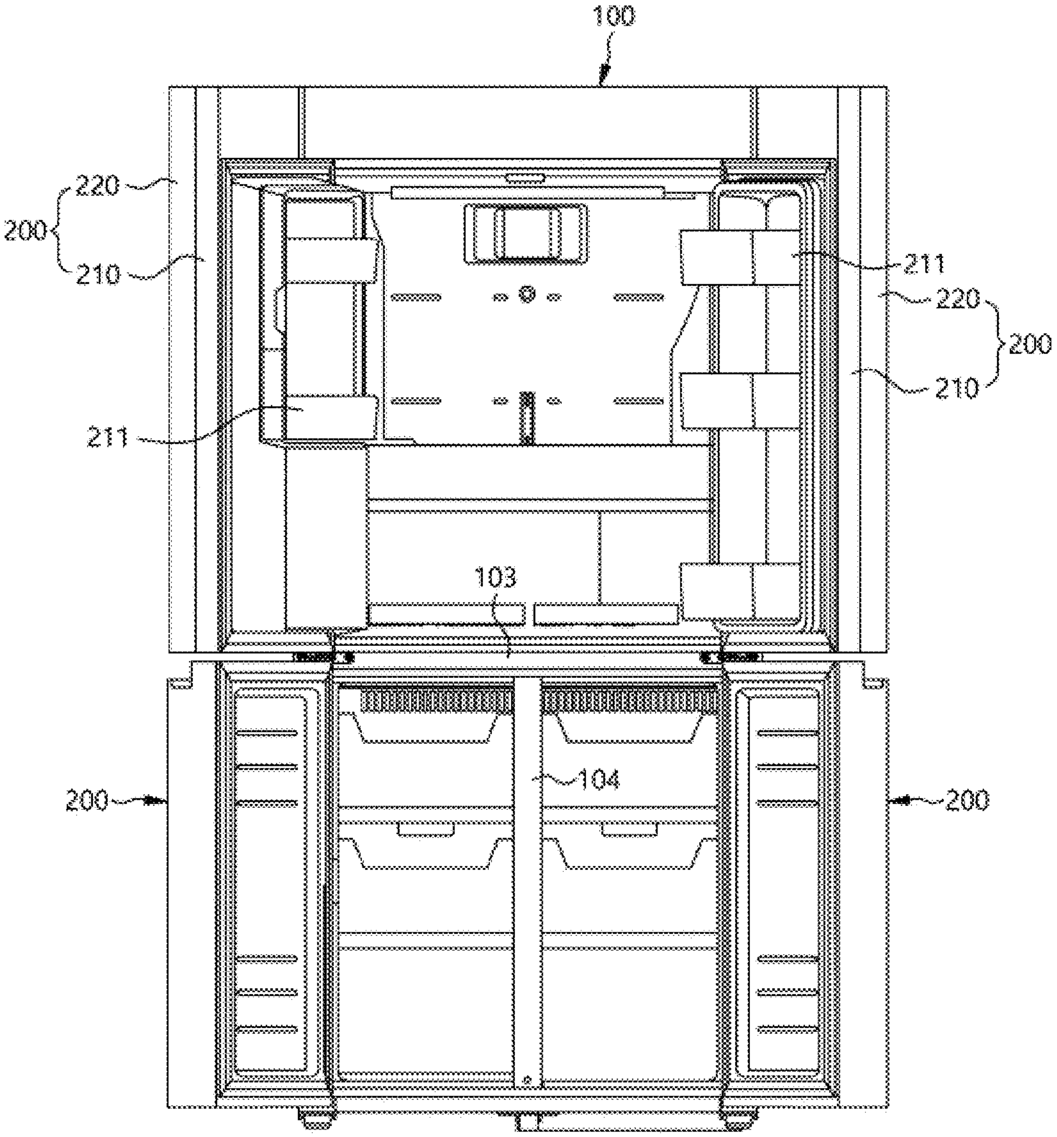

[FIG.4]
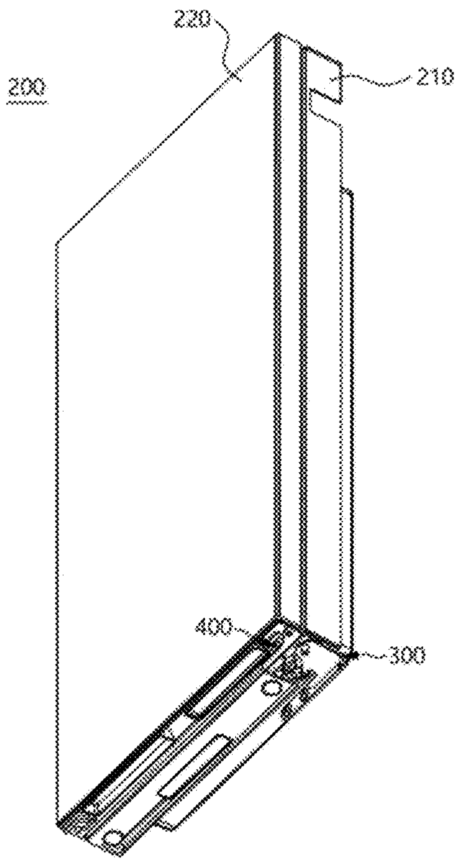
[FIG.5]
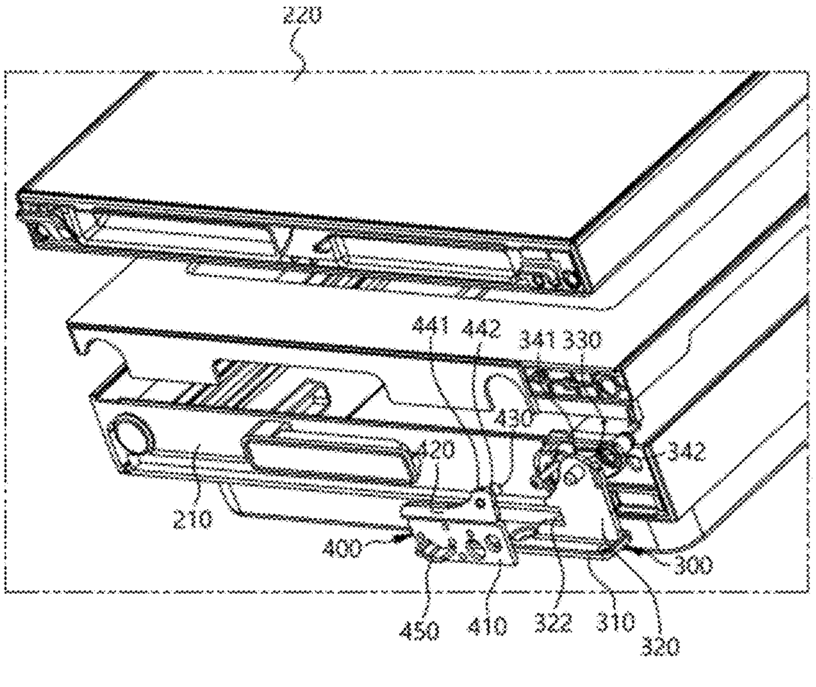

[FIG.6]
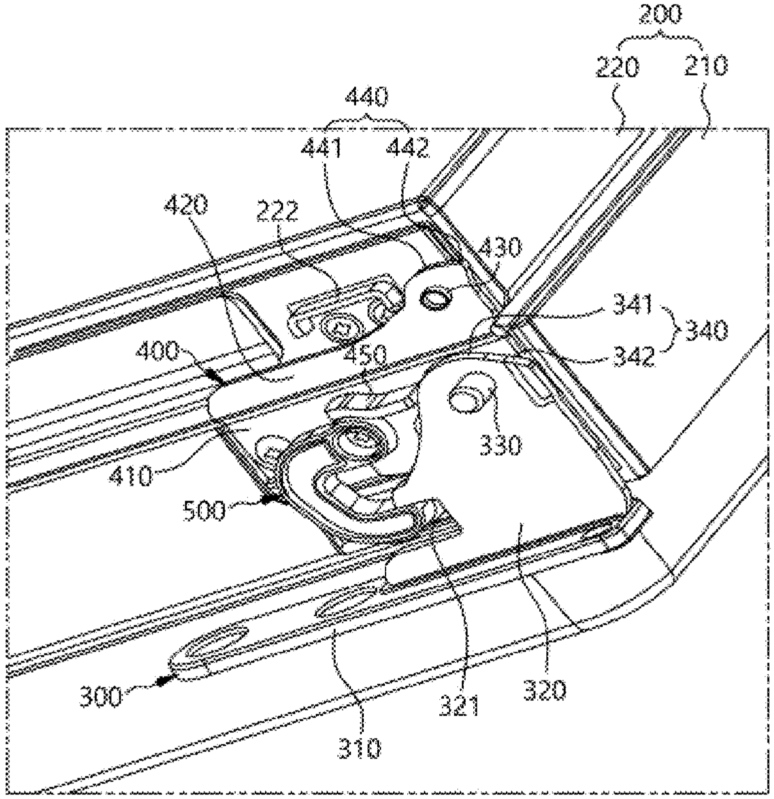
[FIG.7]
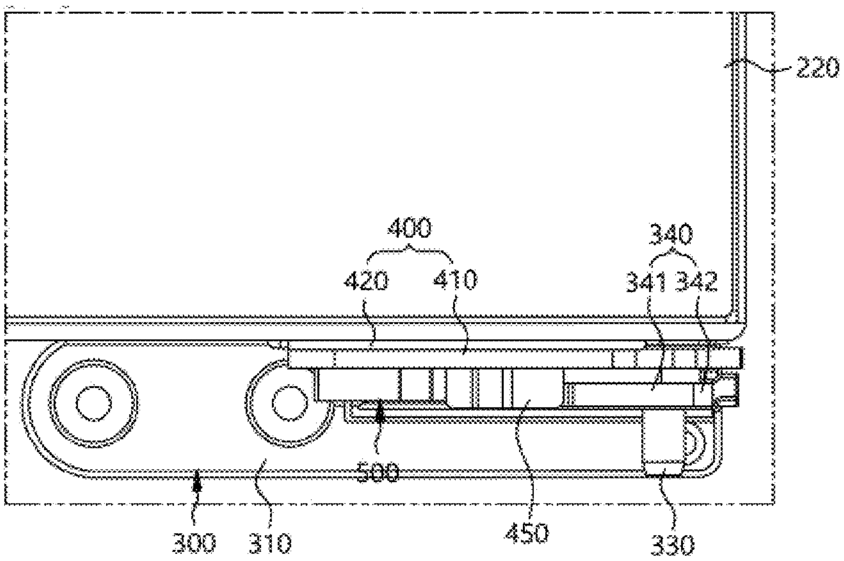

[FIG.8]
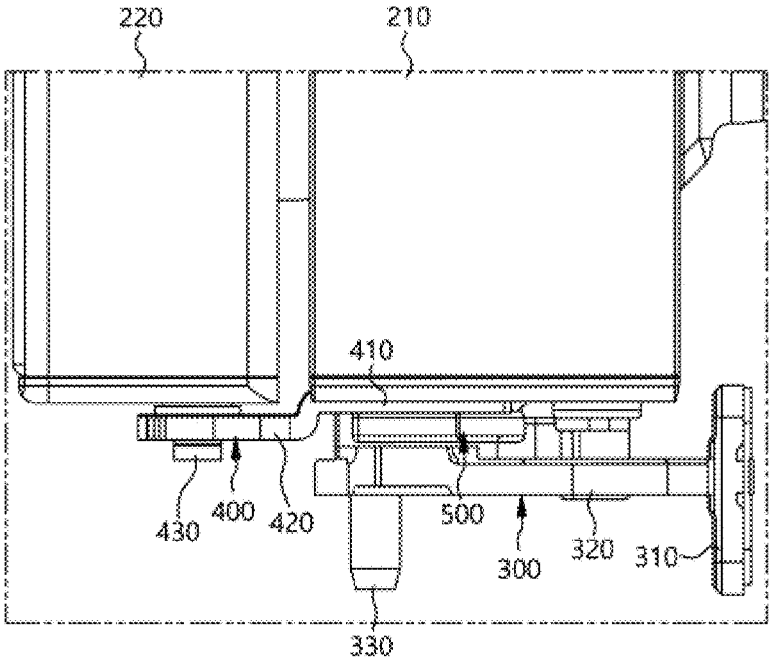
[FIG.9]
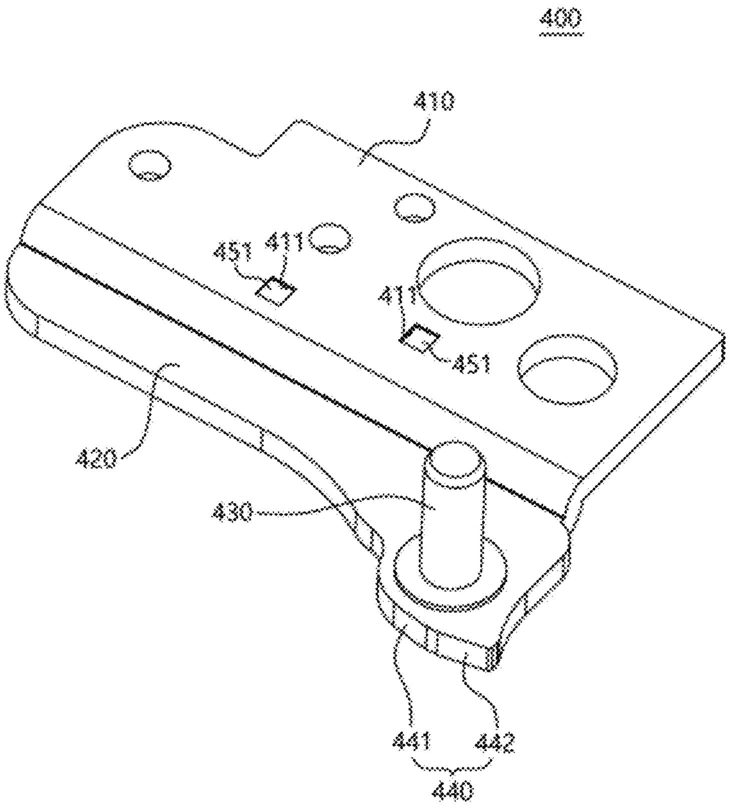

[FIG.10]
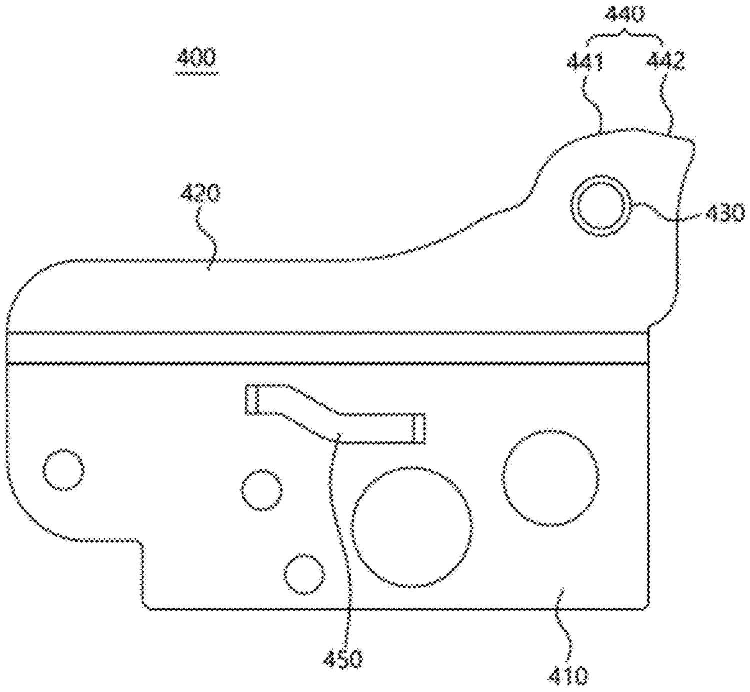
[FIG.11]
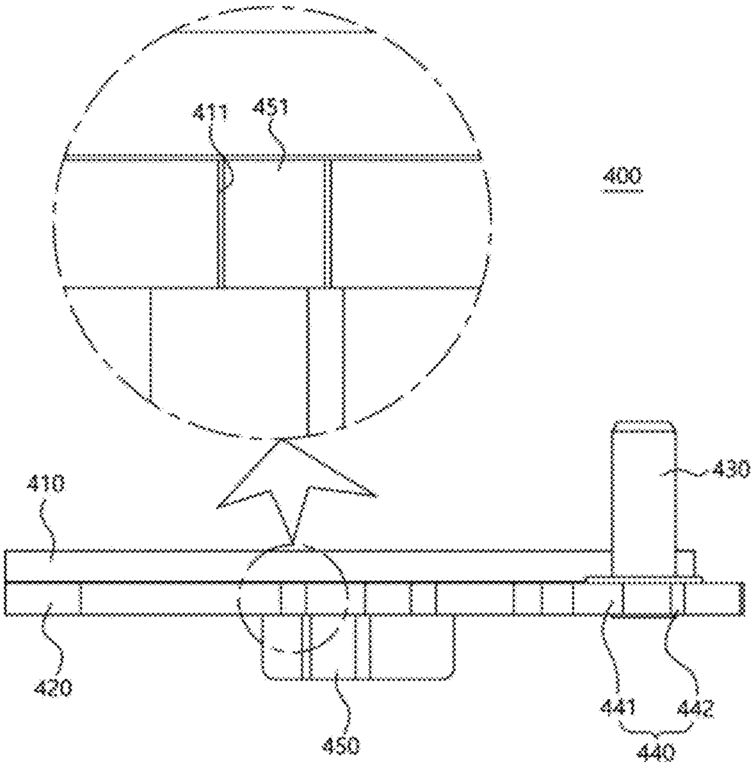

[FIG.12]
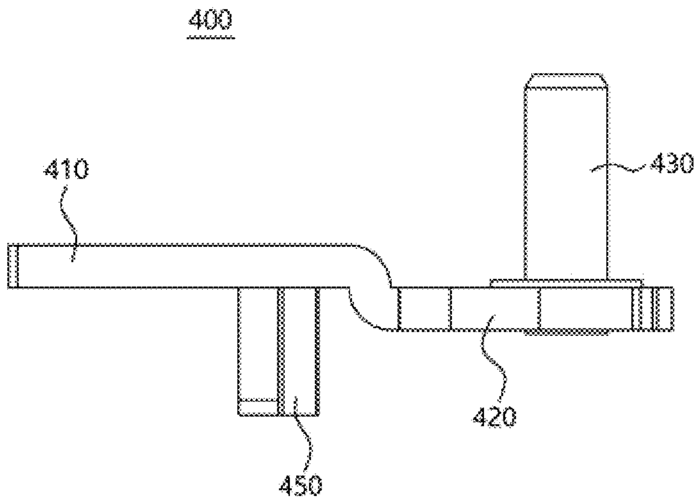
[FIG.13]
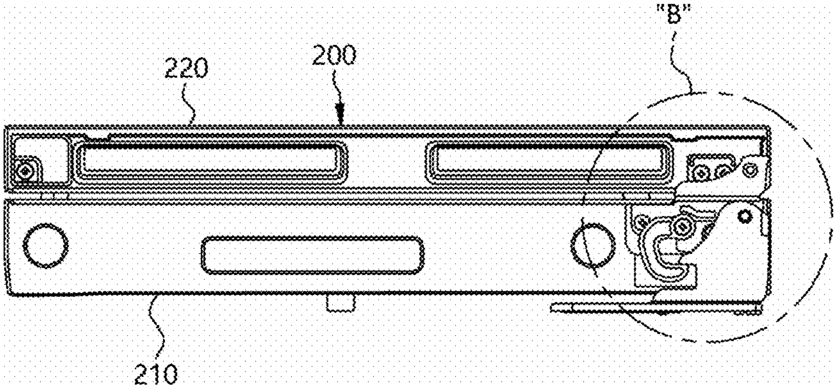

[FIG.14]
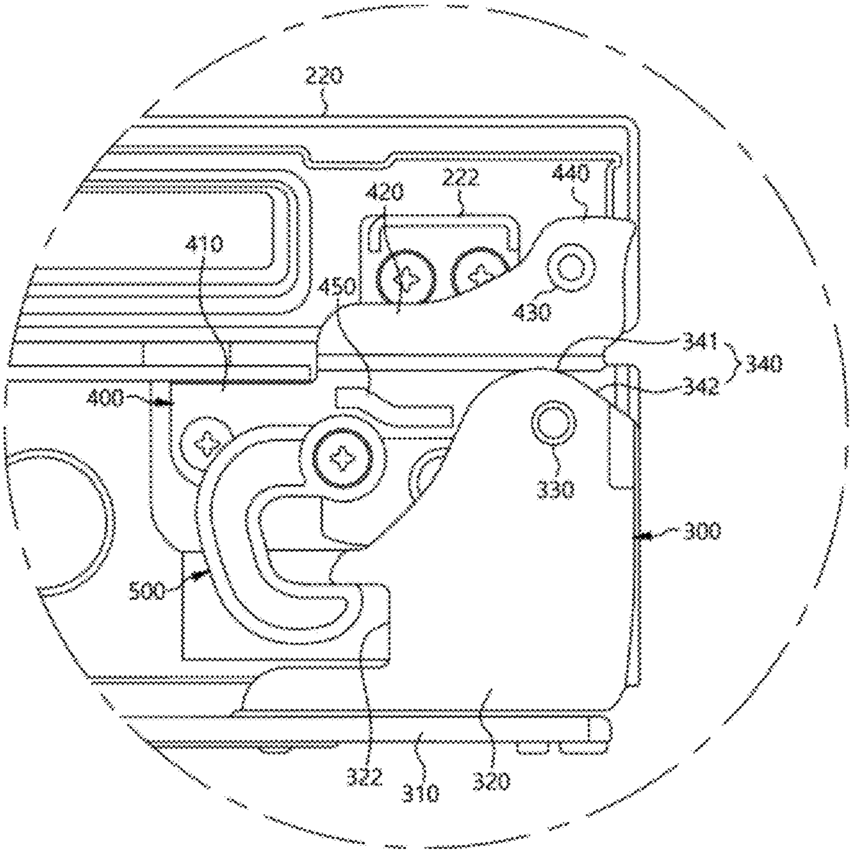
[FIG.15]
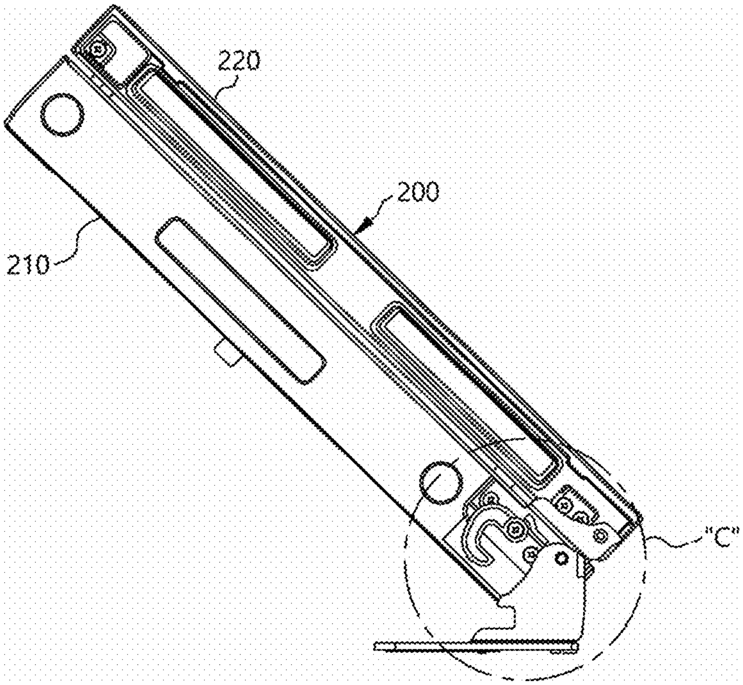

[FIG.16]
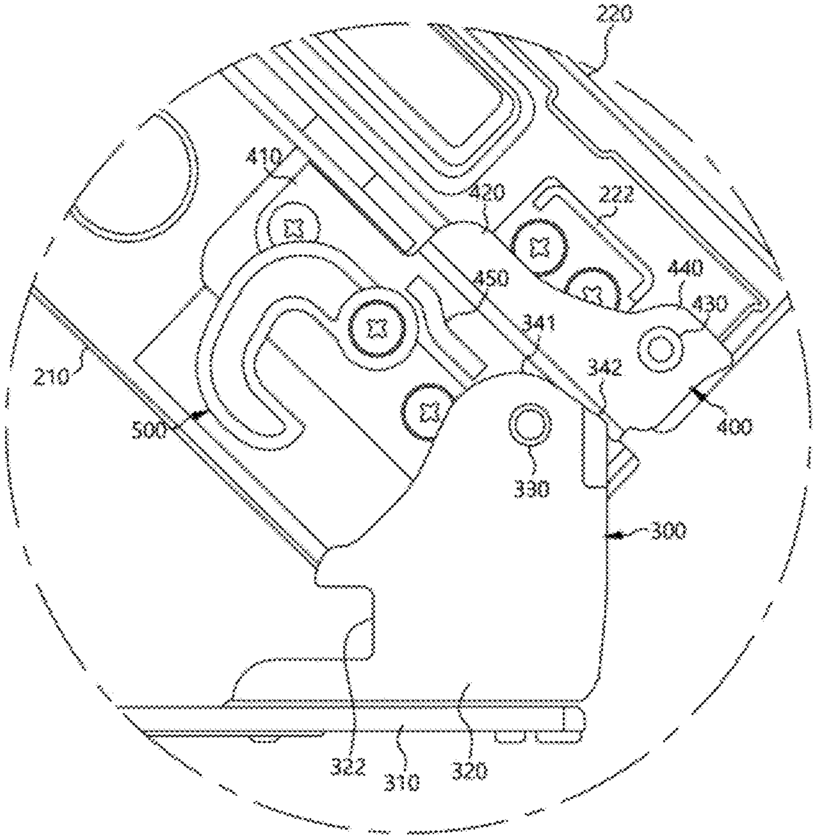
[FIG.17]
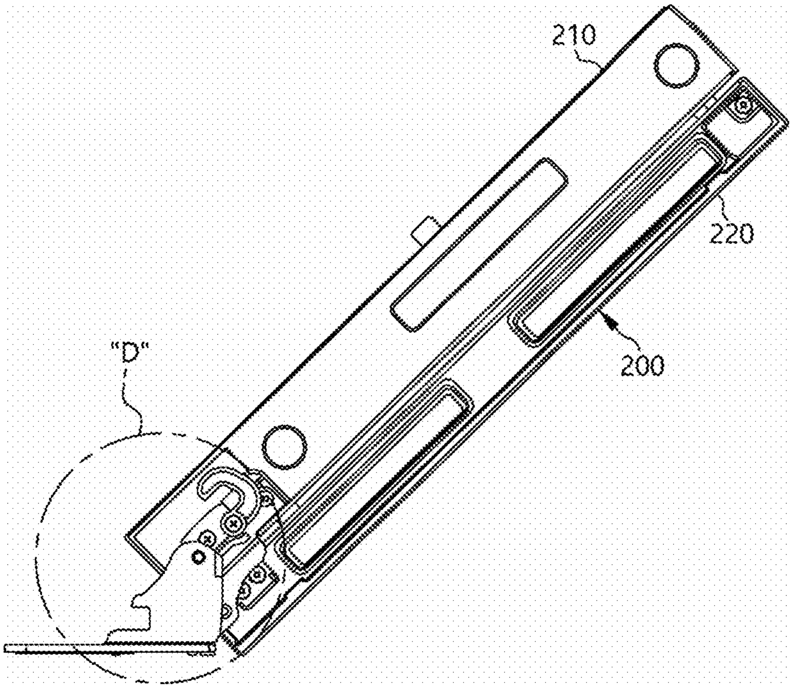

[FIG.18]
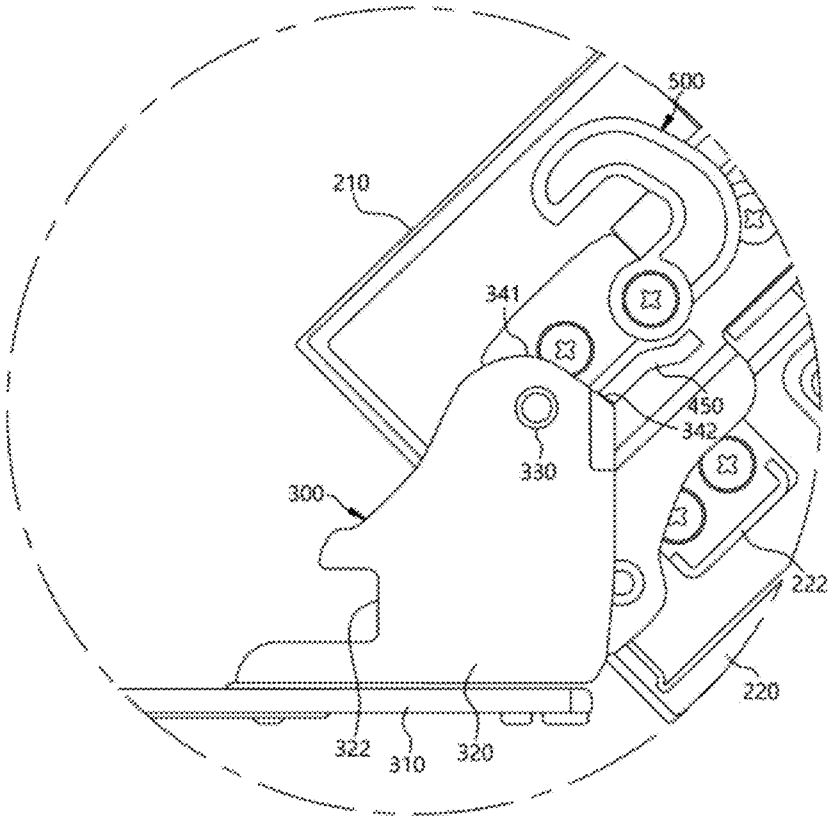
[FIG.19]
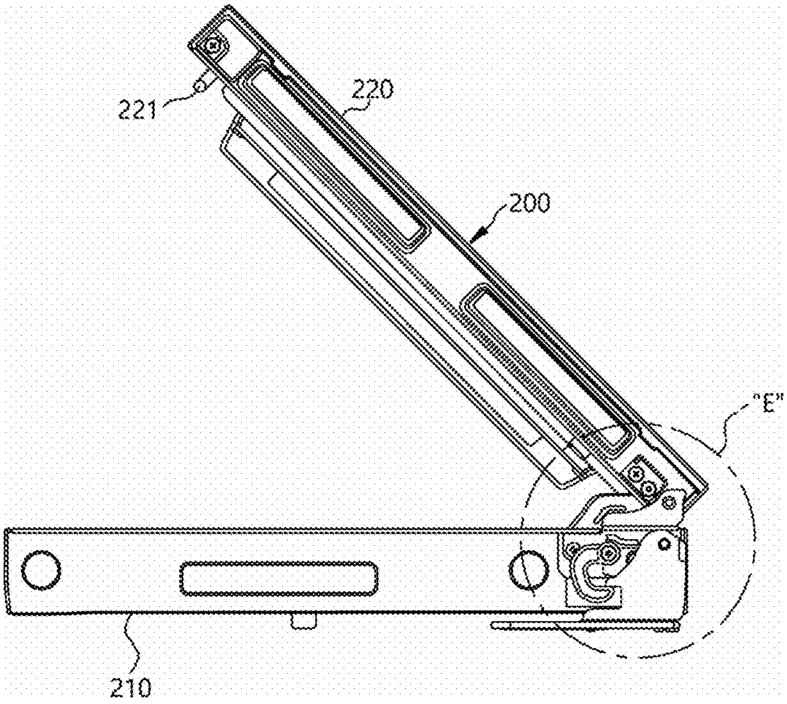

[FIG.20]
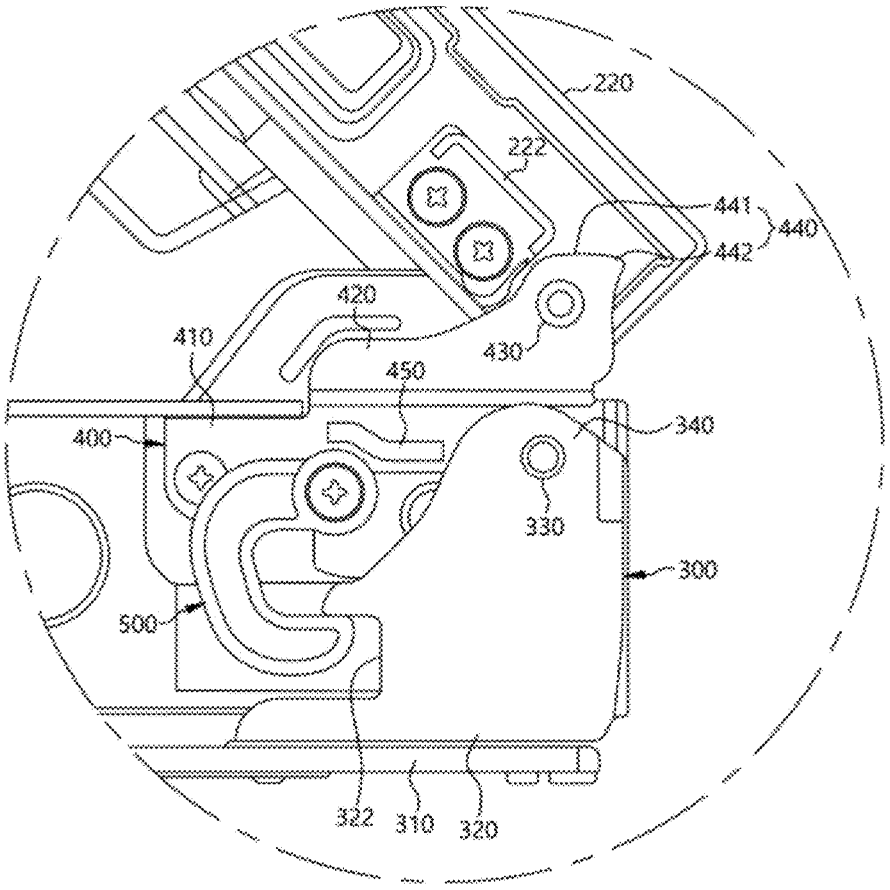

[FIG.21]
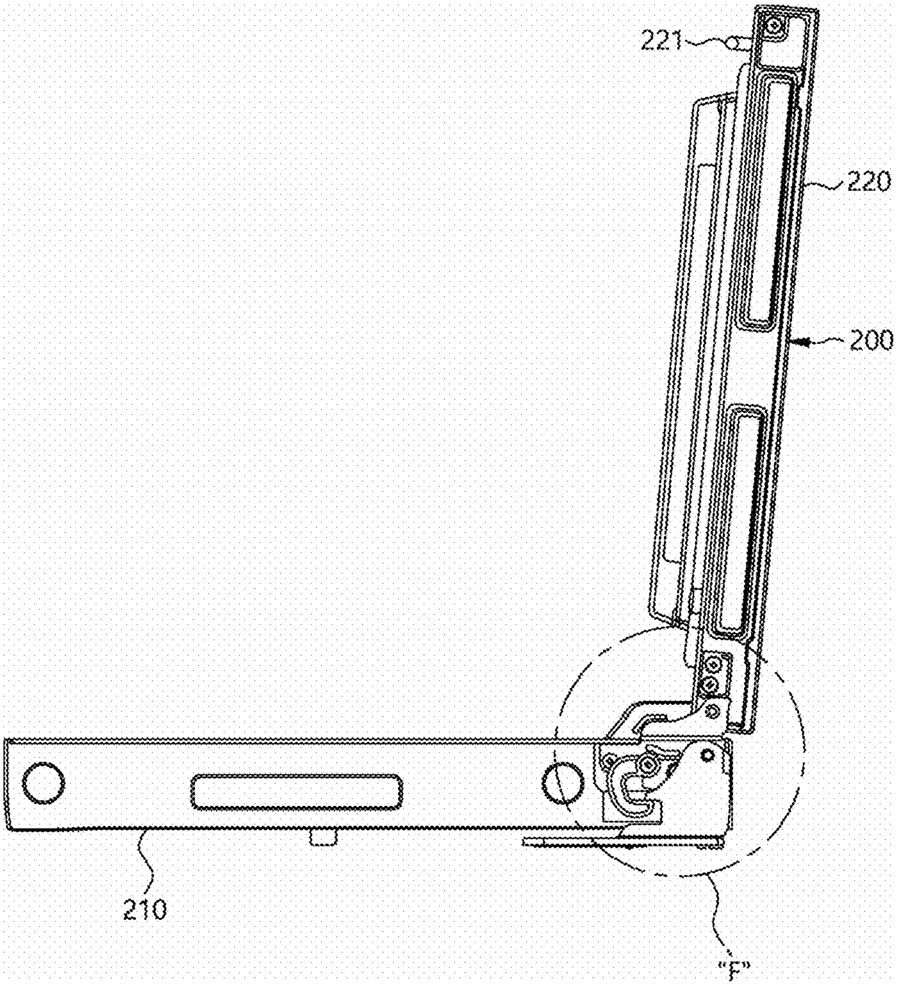

[FIG.22]
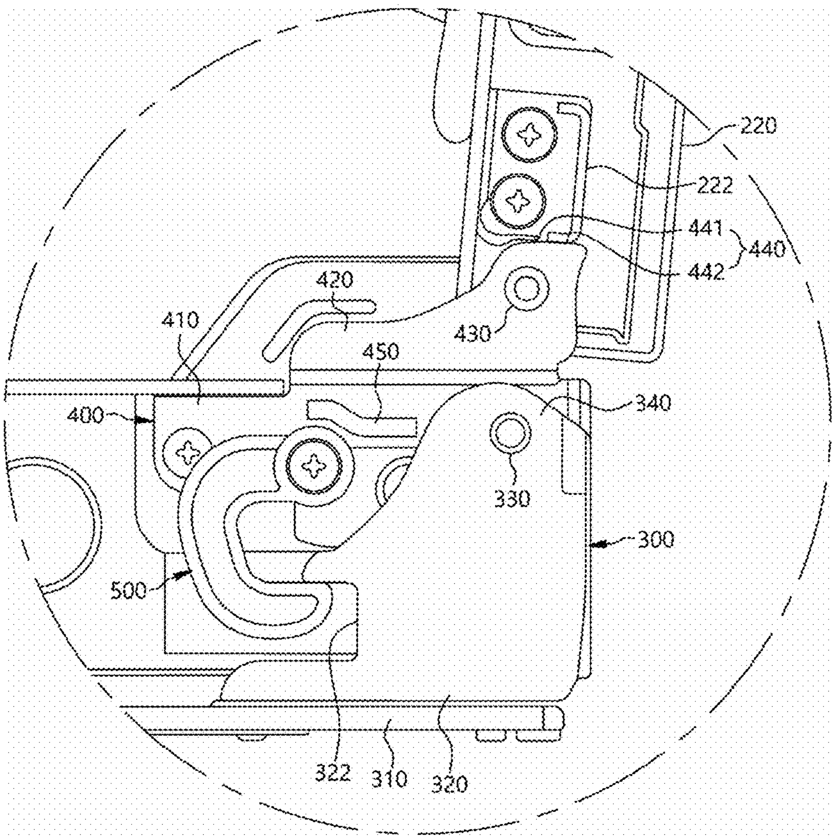

REFRIGERATOR

CROSS REFERENCE TO RELATED APPLICATIONS

This application is the National Phase of PCT International Application No. PCT/KR2022/015593, filed on Oct. 14, 2022, which claims priority under 35 U.S.C. 119 (a) to Patent Application No. 10-2021-0170428, filed in the Republic of Korea on Dec. 1, 2021, all of which are hereby expressly incorporated by reference into the present application.

TECHNICAL FIELD

The present disclosure relates to a refrigerator having a hinge assembly for a double door.

BACKGROUND ART

In general, a refrigerator is a home appliance designed to store various foods for a long period of time using cold air generated by the circulation of a refrigerant according to a refrigeration cycle.

Such a refrigerator may be divided into a refrigerator having a rotary door, a refrigerator having a drawer door, and a mixed opening/closing refrigerator with both rotary and drawer doors according to an opening/closing method of the door that opens and closes an internal storage compartment of a cabinet. Here, the mixed opening/closing refrigerator is a refrigerator having a structure in which a rotary door is applied to an upper side of a cabinet and a drawer-type door is applied to a lower side thereof.

The refrigerator having the rotary door is configured to be rotated by being supported by a hinge assembly when the door is opened and closed.

The hinge assembly is provided in a fixed state to the cabinet, and the door is rotatably installed in the hinge assembly.

More recently, a Door in Door (DID) type double door has been introduced, in which an auxiliary door is additionally installed on a main door. This allows access to a storage compartment or a separate storage space installed on the main door, even when the main door is not opened.

The above-described double door is usually configured such that the main door is rotatably installed on any one hinge assembly fixed to the cabinet, and the auxiliary door is rotatably installed on the other hinge assembly fixed to the main door. Accordingly, the main door and the auxiliary door together or only the auxiliary door may be operated. In this regard, it is presented in Korean Patent Publication No. 10-2014-0104640 (prior art 1), Korean Patent Publication No. 10-2016-0044233 (prior art 2), Korean Patent Publication No. 10-2017-0082088 (prior art 3), Korean Registered Patent No. 10-1653315 (prior art 4).

Meanwhile, in the case of a lower hinge assembly used for a bottom edge of the conventional double door, a stopper for limiting the maximum rotation angle of the main door is additionally provided (see prior art 3). That is, a stopper plate having the stopper is additionally provided separately from a hinge plate having a hinge shaft.

Accordingly, in the prior art, the hinge plate was bolted (or screwed) to the lower end of the front surface of the main door. In the case of the stopper plate, the stopper plate was bolted (or screwed) to the bottom surface of the main door. As a result, the conventional double door had the disadvantage of being aesthetically unpleasing due to the exposure of the bolting fastening part to the lower front of the main door when the auxiliary door is opened.

Of course, as in the prior art 1, the stopper and the hinge may be integrally formed in a single hinge assembly. However, in the case of the structure of the prior art 1, a portion for mounting the hinge and a portion for mounting the cam member and a portion in which the stopper is formed are formed so as to have different bending structures from each other, and thus it is difficult to manufacture and the manufacturing cost is high.

That is, in order to manufacture the hinge assembly of the prior art 1, many post-processing treatments are required, such as several bending treatments, notching and burr operations, and the manufacturing costs were inevitably high.

DETAILED DESCRIPTION OF THE DISCLOSURE

Technical Problem

The present disclosure has been devised to solve various problems according to the prior art.

To this end, the purpose of the present disclosure is to provide a refrigerator having a new type of hinge assembly for a double door, which is advantageous for management and manufacturing operations by reducing the number of components.

The purpose of the present disclosure is to provide the refrigerator having the hinge assembly for the double door that makes it easy to manufacture while allowing a stopper for limiting the opening angle of a main door to be formed integrally with a hinge plate.

In addition, the purpose of the present disclosure is to provide the refrigerator having the hinge assembly for the double door that may improve aesthetics by minimizing the exposure of the hinge assembly even when an auxiliary door is opened.

Problem Solving

In order to achieve the above purposes, a refrigerator according to the present disclosure may include a first door that opens and closes a storage compartment and is rotatably installed in a cabinet.

According to the refrigerator of the present disclosure, a second door may be included to be rotatably installed in the first door and configured to open and close the first door.

According to the refrigerator of the present disclosure, a first hinge assembly in which the first door is rotatably installed may be included.

According to the refrigerator of the present disclosure, the first hinge assembly may be fixed to the cabinet.

According to the refrigerator of the present disclosure, the first hinge assembly may include a first hinge shaft in which the first door is rotatably installed and a first cam portion for limiting an opening angle of the first door.

According to the refrigerator of the present disclosure, a second hinge assembly in which the second door is rotatably installed may be included.

According to the refrigerator of the present disclosure, the second hinge assembly may be fixed to the first door.

According to the refrigerator of the present disclosure, the second hinge assembly may include a second hinge shaft in which the second door is rotatably installed and a second cam portion for limiting an opening angle of the second door.

According to the refrigerator of the present disclosure, a first stopper may be formed in the second door in contact with any one portion of the second hinge assembly when the second door is rotated to reach a set angle.

According to the refrigerator of the present disclosure, when the second door is rotated to reach the set angle, the first stopper may contact any one portion of the outer surface of the second cam portion provided in the second hinge assembly.

According to the refrigerator of the present disclosure, when the first door is rotated to reach a set angle, a second stopper contacting any one portion of the first hinge assembly may be formed in the second hinge assembly.

According to the refrigerator of the present disclosure, when the first door is rotated to reach the set angle, the second stopper may contact any one of the outer surfaces of the first cam portion provided in the first hinge assembly.

According to the refrigerator of the present disclosure, the first stopper may be formed on the bottom surface of the second door.

According to the refrigerator of the present disclosure, the second stopper may be formed on the bottom surface of the second hinge assembly.

According to the refrigerator of the present disclosure, the second hinge assembly and the second stopper may have a structure protruding or recessed to correspond to each other and to be coupled to each other.

According to the refrigerator of the present disclosure, at least one coupling hole may be formed in the second hinge assembly, and a coupling protrusion coupled and fixed to the coupling hole may be formed in the second stopper.

According to the refrigerator of the present disclosure, the coupling protrusion may be inserted into the coupling hole and then fused and fixed.

According to the refrigerator of the present disclosure, the second cam portion of the second hinge assembly may have a round surface formed to be rounded along the rotational direction of the second door around the second hinge shaft.

According to the refrigerator of the present disclosure, a stopping surface protruding from the round surface may be formed in the second cam portion of the second hinge assembly to allow the first stopper to be caught.

According to the refrigerator of the present disclosure, the first stopper may be disposed to move along a circumference of the round surface of the second cam portion during the rotation operation for opening the second door.

According to the refrigerator of the present disclosure, the first stopper may be disposed to be caught by the stopping surface of the second cam portion during the rotation operation for opening the second door.

According to the refrigerator of the present disclosure, the second hinge assembly may include a coupling end that contacts and is coupled to the bottom surface of the first door.

According to the refrigerator of the present disclosure, the second hinge assembly may include an extension end extending from the coupling end.

According to the refrigerator of the present disclosure, the extension end of the second hinge assembly may be positioned to face the bottom surface of the second door.

According to the refrigerator of the present disclosure, the second hinge shaft and the second cam portion may be positioned at the extension end of the second hinge assembly.

According to the refrigerator of the present disclosure, the extension end of the second hinge assembly may be formed to be spaced apart from the bottom surface of the second door.

According to the refrigerator of the present disclosure, the first hinge assembly may include a fixing end fixed to the cabinet.

According to the refrigerator of the present disclosure, the first hinge assembly may include an extension end positioned to face the bottom surface of the first door.

According to the refrigerator of the present disclosure, a first hinge shaft and a first cam portion may be positioned at the extension end of the first hinge assembly.

According to the refrigerator of the present disclosure, the fixing end of the first hinge assembly may be fixed to a front surface of the cabinet.

According to the refrigerator of the present disclosure, the extension end of the first hinge assembly may be bent from the fixing end.

Effect of the Disclosure

The refrigerator of the present disclosure as described above provides the following effects.

The refrigerator according to the present disclosure may facilitate management and assembly operations by minimizing components of a hinge assembly for opening and closing a double door.

In the refrigerator of the present disclosure, a second stopper that hits a first cam portion of a first hinge assembly is formed in a second hinge assembly to limit the rotation angle of a first door, thereby reducing the number of components. In particular, the second stopper may be easily manufactured because it is configured to be integrated with the second hinge assembly through coupling and welding.

In the refrigerator of the present disclosure, since the second hinge assembly is configured to be coupled to the bottom surface of the first door, an exposed portion of the second hinge assembly may be minimized even when the second door is opened.

BRIEF DESCRIPTION OF THE DRAWINGS

FIG. 1 is a perspective view of an exterior of a refrigerator according to an embodiment of the present disclosure.

FIG. 2 is a front view of the refrigerator according to the embodiment of the present disclosure.

FIG. 3 is a front view showing a state in which a door assembly of the refrigerator is opened according to the embodiment of the present disclosure.

FIG. 4 is a perspective view of the door assembly of the refrigerator according to the embodiment of the present disclosure.

FIG. 5 is an exploded perspective view of a lower portion of the door assembly of the refrigerator according to the embodiment of the present disclosure.

FIG. 6 is a perspective view of a lower portion of the door assembly of the refrigerator according to the embodiment of the present disclosure.

FIG. 7 is an enlarged view of a portion "A" of FIG. 2.

FIG. 8 is an enlarged view of main parts in view of a state in which each hinge assembly of the refrigerator is disposed according to the embodiment of the present disclosure.

FIG. 9 is a top perspective view illustrating a second hinge assembly of the refrigerator according to the embodiment of the present disclosure.

FIG. 10 is a bottom view illustrating the second hinge assembly of the refrigerator according to the embodiment of the present disclosure.

FIG. 11 is a front view illustrating the second hinge assembly of the refrigerator according to the embodiment of the present disclosure.

FIG. 12 is a side view illustrating the second hinge assembly of the refrigerator according to the embodiment of the present disclosure.

FIG. 13 is a view illustrating a state in which a first door constituting the door assembly of the refrigerator is closed according to the embodiment of the present disclosure.

FIG. 14 is an enlarged view of a portion "B" of FIG. 13.

FIG. 15 is a view illustrating a state in which the first door constituting the door assembly of the refrigerator is partially opened according to the embodiment of the present disclosure.

FIG. 16 is an enlarged view of a portion "C" of FIG. 15.

FIG. 17 is a view illustrating a state in which the first door constituting the door assembly of the refrigerator is fully opened according to the embodiment of the present disclosure.

FIG. 18 is an enlarged view of a portion "D" of FIG. 17.

FIG. 19 is a view illustrating a state in which a second door constituting the door assembly of the refrigerator is partially opened according to the embodiment of the present disclosure.

FIG. 20 is an enlarged view of a portion "E" of FIG. 19.

FIG. 21 is a view illustrating a state in which the second door constituting the door assembly of the refrigerator is fully opened according to the embodiment of the present disclosure.

FIG. 22 is an enlarged view of a portion "F" of FIG. 21.

DETAILED DESCRIPTION OF THE DISCLOSURE

Hereinafter, a preferred embodiment of a refrigerator will be described with reference to FIGS. 1 to 22.

FIG. 1 is a perspective view illustrating an exterior of the refrigerator according to the embodiment of the present disclosure, and FIG. 2 is a front view illustrating the exterior of the refrigerator according to the embodiment of the present disclosure.

As illustrated in these drawings, the refrigerator according to the embodiment of the present disclosure may include a cabinet 100.

The cabinet 100 may form an exterior of the refrigerator. At least one storage compartment 101 and 102 may be provided in the cabinet 100. The storage compartments 101 and 102 may store food, beverages, and the like, and may store the stored goods for a long period of time by using cold air generated by a freezing system (not shown).

Two or more storage compartments 101 and 102 may be provided. For example, as shown in the embodiment, the storage compartments 101 and 102 may be provided as an upper storage compartment 101 and a lower storage compartment 102. In this case, the two storage compartments 101 and 102 may be partitioned from each other by a partition wall 103. In addition, as shown in the embodiment, the lower storage compartment 102 may be divided into two left and right spaces by another partition wall 104. Although not shown, the lower storage compartment 102 may be formed in only one space.

The storage compartments 101 and 102 may be maintained at different temperatures. For example, the upper storage compartment 101 may be maintained at a refrigeration temperature, and the lower storage compartment 102 may be maintained at a freezing temperature.

Next, the refrigerator according to the embodiment of the present disclosure may include a door assembly 200.

The door assembly 200 opens and closes the storage compartment 101 of the cabinet 100. That is, the storage compartments 101 and 102 of the cabinet 100 may be opened or closed by the operation of the door assembly 200.

The door assembly 200 is installed in the cabinet 100 to open and close the storage compartments 101 and 102. In this case, the door assembly 200 may be rotatably installed in the cabinet 100 by a first hinge assembly 300, which will be described later, and may open or close the storage compartments 101 and 102 while being rotated by a user's manipulation.

The door assembly 200 may be provided one by one for each of the storage compartments 101 and 102, or two or more door assemblies 200 may be provided to open and close one storage compartment. For example, as shown in the embodiment, two door assemblies 200 may be provided to open and close the upper storage compartment 101, and the lower storage compartment 102 may be configured to be opened and closed by different door assemblies 200 for each space.

Also, at least one door assembly of each of the door assemblies 200 may be provided as a double door including two or more doors 210 and 220. For example, as illustrated in the embodiment, the right door assembly 200 of the upper storage compartment 101 may include a double door including a first door 210 and a second door 220. Although not shown in detail, the left door assembly 200 or the two lower door assemblies 200 may also be configured as the double door.

The first door 210 and the second door 220 may be configured to operate together or individually while being provided overlapping each other. This will be described in more detail as follows.

First, the first door 210 serves to open and close the storage compartment 101 of the cabinet 100, and may be rotatably installed in the cabinet 100. Although not shown, the first door 210 and the cabinet 100 may be maintained in close contact with each other by the magnetic force of a magnetic member (not shown) located on the opposite surfaces of each other. That is, when the first door 210 is closed, the storage compartment 101 of the cabinet 100 may be kept closed while being in close contact with the front of the cabinet 100 by the magnetic force.

A separate storage space may be provided in the first door 210, and the storage space may be formed to receive cold air in the storage compartment 101 and to be open into the room. In this case, the storage space may be formed as, for example, a storage box 211 or a shelf.

The second door 220 may be rotatably installed on the first door 210 and may be operated to open or close the storage space of the first door 210.

As shown in the embodiment, the second door 220 may be disposed on the outer surface of the first door 210 to cover the entire outer surface of the first door 210. For example, the second door 220 may have a width (left and right, top and bottom) equal to or greater than that of the first door 210, or may be formed to be larger than that of the first door 210. Although not shown, the second door 220 may be formed to cover only a portion of the outer surface of the first door 210, or the second door 220 may be formed to be received from the surface of the first door 210.

Meanwhile, the second door 220 may be maintained in a closed state with respect to the first door 210 by a retaining member (not shown). The retaining member may be, for example, a hook provided on one of the opposing surfaces of the first door 210 and the second door 220. In this case, a retaining groove (not shown) to which the retaining member is retained may be formed on the other surface of the opposing surfaces of the first door 210 and the second door 220.

The retaining member may preferably be configured to be released by a user's manipulation, and in this case, the user's manipulation may include any one of, for example, touching, pressing, and pulling of the second door 220.

The structure of retaining the second door 220 to the first door 210 is not limited to the retaining member. For example, although not shown, a magnetic member may be provided on at least one of the opposing surfaces between the second door 220 and the first door 210 to maintain the mutual retention.

Next, the refrigerator according to the embodiment of the present disclosure may include a first hinge assembly 300.

The first hinge assembly 300 is provided to support the rotation of the first door 210 of the door assembly 200 including double doors.

As shown in FIGS. 4 to 8, the first hinge assembly 300 may be fixed to the cabinet 100. For example, the first hinge assembly 300 may include a fixing end 310 fixed to the cabinet 100. The fixing end 310 is fastened and fixed to the cabinet 100 using a screw or a bolt while being in contact with the front surface of the cabinet 100 (the front surface of the partition wall).

In addition, the first hinge assembly 300 includes an extension end 320 which is formed at right angles to the fixing end 310. The extension end 320 may be integrally formed with the fixing end 310. That is, the extension end 320 may extend from the fixing end 310.

In particular, the extension end 320 may be bent from the fixing end 310 and disposed perpendicular to the fixing end 310 (or the front surface of the cabinet).

A first hinge shaft 330 may be provided at the extension end 320. The first hinge shaft 330 may protrude upward through the extension end 320 and be fixed to the extension end 320. For example, the first hinge shaft 330 may be fixed to the extension end 320 through welding or the like while being installed to penetrate the extension end 320. In this case, the first hinge shaft 330 may be installed to penetrate the bottom surface of the first door 210. Accordingly, the first door 210 may be rotated with respect to the first hinge shaft 330.

A first cam portion 340 may be provided at the extension end 320. The first cam portion 340 may be formed at a circumferential portion of the first hinge shaft 330 to have a round surface 341 rounded along a rotation direction of the first door 210, and a stopping surface 342 protruding from any one portion of the round surface 341 to stop or catch a second stopper 350 to be described later. In this case, the stopping surface 342 may be formed to be stepped from the round surface 341.

Next, the refrigerator according to the embodiment of the present disclosure may include a second hinge assembly 400.

The second hinge assembly 400 is provided to support the rotation of the second door 220 of the double door assembly 200.

As shown in FIGS. 4 to 8, the second hinge assembly 400 may be coupled to the first door 210 of the door assembly 200. For example, the second hinge assembly 400 may include a coupling end 410 coupled to the first door 210. The coupling end 410 is fastened and fixed to the first door 210 using a screw or a bolt while being in contact with the bottom surface of the first door 210.

In addition, the second hinge assembly 400 includes an extension end 420 extending from the coupling end 410 as shown in FIGS. 9 to 12. The extension end 420 may be formed to face the bottom surface of the second door 220 from the front surface of the coupling end 410.

The extension end 420 may be formed to be parallel to the bottom surface of the second door 220. In particular, the extension end 420 may be formed to be spaced apart from the bottom surface of the second door 220, and to this end, the extension end 420 may be bent from the coupling end 410.

A second hinge shaft 430 may be provided at the extension end 420. The second hinge shaft 430 may protrude upward through the extension end 420 and be fixed to the extension end 420. For example, the second hinge shaft 430 may be fixed to the extension end 420 through welding or the like while being installed to penetrate the extension end 420. In this case, the second hinge shaft 430 may be installed to penetrate the bottom surface of the second door 220. Accordingly, the second door 220 may be rotated with respect to the second hinge shaft 430.

A second cam portion 440 may be provided at the extension end 420. The second cam portion 440 may be configured to have a rounded surface 441 formed at the circumferential side of the second hinge shaft 430 to be rounded along the rotation direction of the second door 220, and a stopping surface 442 protruding from the rounded surface 441 so that a first stopper 222, to be described later, may be caught. In this case, the stopping surface 442 may be formed to be stepped from the round surface 441.

Meanwhile, the first stopper 222 may be formed in the second door 220. For example, the first stopper 222 may protrude from a bottom surface of the second door 220.

In particular, the first stopper 222 may be disposed to be caught by the stopping surface 442 while being moved along the circumference of the round surface 441 forming the second cam portion 440 during a rotation operation for opening the second door 220.

The first stopper 222 may be formed to have a long structure in one direction. That is, the first stopper 222 may be formed to have a long structure in a direction in which the opening of the second door 220 contacts the stopping surface 442 of the second cam portion 440. As a result, even when the first stopper 222 hits the stopping surface 442 due to frequent opening of the second door 220, the first stopper 222 may be prevented from being deformed or damaged.

In addition, a second stopper 450 may be formed in the second hinge assembly 400. The second stopper 450 contacts the stopping surface 342 of the first cam portion 340 when the first door 210 is rotated to reach a set angle. That is, the rotation angle (opening angle) of the first door 210 may be limited by the second stopper 450 and the first cam portion 340.

The second stopper 450 may protrude from a bottom surface of the second hinge assembly 400. For example, the second stopper 450 may protrude downward from the bottom surface of the coupling end 410 of the second hinge assembly 400.

The second stopper 450 may be manufactured separately from the coupling end 410 and then integrated with the bottom surface of the coupling end 410. For example, at least one coupling hole 411 may be formed on the bottom surface of the coupling end 410, and a coupling protrusion 451 coupled to and fixed to the coupling hole 411 may be formed on an upper surface of the second stopper 450. That is, the coupling protrusion 451 is inserted into the coupling hole 411 and then welded to the coupling hole 411, so that they may be integrated with each other.

As another example, the coupling hole 411 and the coupling protrusion 451 may be configured to be coupled and fixed to each other using a force fitting, or may be configured to be coupled and fixed to each other through a bonding operation.

As another example, the second stopper 450 may be integrally formed with the coupling end 410 and then protrude downward through a bending operation. However, considering that the second stopper 450 and the coupling end 410 are disposed in a direction perpendicular to each other, there is a difficulty in a work in which several bending processes must be sequentially performed during the bending operation. Therefore, as in the embodiment of the present disclosure described above, it may be more desirable to manufacture the second stopper 450 and the coupling end 410 separately and then integrate them together by a welding operation after a customized coupling.

The second stopper 450 may be formed to have a long structure in one direction. That is, the second stopper 450 may be formed to have a long structure in a direction in which the opening of the first door 210 contacts the stopping surface 342 of the first cam portion 340. As a result, even when the second stopper 450 hits the stopping surface 342 due to frequent opening of the first door 210, the second stopper 450 may be prevented from being deformed or damaged. Of course, the stopping surface 342 may also be formed such that the thickness of the corresponding part is thicker than that of other parts to prevent damage.

Meanwhile, in the embodiment of the present disclosure, a stopping member 500 may be further provided. As shown in FIGS. 6 and 14, the stopping member 500 serves to prevent unwanted opening of the first door 210 in a state in which the first door 210 is closed. That is, when the first door 210 is closed, one end of the stopping member 500 may be caught by a stopping groove 322 formed in the extension end 320 of the first hinge assembly 300. In this case, the stopping member 500 may be formed to be elastically deformable for smooth locking and releasing. For example, as shown in the embodiment, the stopping member 500 may be formed in a round structure capable of being retracted or deformed for opening.

The other end of the stopping member 500 may be fixed to the coupling end 410 of the second hinge assembly 400.

Hereinafter, the operation of each of the hinge assemblies 300 and 400 constituting the refrigerator according to the embodiment of the present disclosure will be described in more detail.

First, as shown in FIGS. 13 and 14, in a general situation, the first door 210 of the refrigerator keeps the storage compartment 101 closed. At this time, the other end of the stopping member 500, which has one end fixedly coupled to the second hinge assembly 400, is maintained in a state of being caught by the stopping groove 322 formed in the extension end 320 of the first hinge assembly 300. Accordingly, the first door 210 may be prevented from being unintentionally opened from the cabinet 100.

In addition, the second door 220 is positioned to close the first door 210. At this time, the second door 220 may maintain the first door 210 in a closed state by the retaining member.

Next, when the first door 210 is in a closed state, at least one of the first door 210 and the second door 220 may be rotated by a user's operation to open the storage compartment 101 or the storage space of the first door 210.

For one example, as shown in FIGS. 15 to 18, when an operation for opening the first door 210 occurs, the first door 210 may be rotated by being supported by the first hinge assembly 300. In this case, the first hinge assembly 300 is fixed to the front surface of the cabinet 100, and the first door 210 is rotatably installed on the first hinge shaft 330 of the first hinge assembly 300. Accordingly, the first door 210 is rotated around the first hinge shaft 330 to open the storage compartment 101.

When the first door 210 is rotated, the second hinge assembly 400 fixed to the bottom surface of the first door 210 and the stopping member 500 having one end fixed to the second hinge assembly 400 are moved together with the first door 210. At this point, the stopping member 500 is separated from the stopping groove 322 formed in the first hinge assembly 300 and is released.

In addition, when the first door 210 is opened by a set angle while the first door 210 is rotated, the second stopper 450 fixed to the second hinge assembly 400 hits the stopping surface 342 of the first cam portion 340 forming the first hinge assembly 300. This is shown in FIG. 18. Accordingly, the first door 210 is no longer rotated and the opening angle is limited.

When the first door 210 is opened by the above-described process, the user may store a new storage in the open storage compartment 101 or take out the stored items in the storage compartment 101.

When the first door 210 is closed while the first door 210 is opened, the first door 210 is rotated around the first hinge shaft 330 of the first hinge assembly 300. When the first door 210 reaches the closed position, the first door 210 closes the opened front surface of the cabinet 100 by a retaining structure (e.g. magnetic force of the magnetic member) provided on the opposite surface between the first door 210 and the cabinet 100. The retaining structure may be provided on at least one of the opposite surfaces between the first door 210 and the cabinet 100.

As another example, the first door 210 may be operated such that only the second door 220 is opened from the first door 210 while maintaining the closed state. That is, the user may operate only the second door 220.

As shown in FIGS. 19 to 22, when only the second door 220 is operated to be opened, the second door 220 is rotated by being supported by the second hinge assembly 400. That is, the second door 220 is rotated around the second hinge shaft 430 of the second hinge assembly 400.

In addition, when the second door 220 is opened by a set angle while the second door 220 is rotated, the first stopper 222 formed on the bottom surface of the second door 220 hits the stopping surface 442 of the second cam portion 440 forming the second hinge assembly 400. This is shown in FIG. 22. Accordingly, the second door 220 is no longer rotated and the opening angle is limited.

When the second door 220 is opened by the above-described process, the user may store additional storage items in the storage space (shelf or storage box) of the opened first door 210 or may take out the stored items in the storage space.

When the second door 220 is closed while the second door 220 is opened, the second door 220 is rotated around the second hinge shaft 430 of the second hinge assembly 400. When the second door 220 reaches the closed position, the second door 220 closes the opened front surface of the first door 210 by a retaining structure (e.g. a retaining member and a retaining groove) provided on the opposite surfaces between the second door 220 and the first door 210. The retaining structure may be provided on at least one of the opposite surfaces between the second door 220 and the first door 210.

As a result, the refrigerator of the present disclosure minimizes components of the hinge assemblies 300 and 400 for opening and closing the double door, thereby facilitating management and assembly work.

In addition, in the refrigerator of the present disclosure, the number of components may be reduced because the second stopper 450 that hits the first cam portion 340 of the first hinge assembly 300 is formed in the second hinge assembly 400 to limit the rotation angle of the first door 210. In particular, since the second stopper 450 is configured to be integrated with the second hinge assembly 400 by coupling and welding, the second stopper 450 may be manufactured more easily than if it is manufactured by a bending operation.

Furthermore, since the second hinge assembly 400 is configured to be coupled to the bottom surface of the first door 210, the exposed portion of the second hinge assembly 400 may be minimized even when the second door is opened.

What is claimed is:

1. A refrigerator comprising:

a cabinet having a storage compartment;

a first door configured to open and close the storage compartment and rotatably installed in the cabinet;

a second door rotatably installed at the first door to open and close the first door;

a first hinge assembly fixed to the cabinet and in which the first door is rotatably installed; and a second hinge assembly fixed to the first door and in which the second door is rotatably installed, wherein the second door is provided with a first stopper which contacts any one portion of the second hinge assembly when the second door is rotated to reach a second door set angle, and the second hinge assembly is provided with a second stopper which contacts any one portion of the first hinge assembly when the first door is rotated to reach a first door set angle, wherein the second hinge assembly includes:

a coupling end configured to contact and couple to a bottom surface of the first door;

an extension end extending from the coupling end to face a bottom surface of the second door, the extension end having a second hinge shaft in which the second door is rotatably installed and a second cam portion configured to limit an opening angle of the second door located on the extension end;

at least one coupling hole in a bottom surface of the coupling end; and a coupling protrusion on an upper surface of the second stopper and configured to be inserted into and fixed to the coupling hole.

2. The refrigerator of claim 1, wherein the first stopper protrudes from the bottom surface of the second door.

3. The refrigerator of claim 1, wherein the second stopper protrudes from a bottom surface of the second hinge assembly.

4. The refrigerator of claim 1, wherein the first hinge assembly includes a first hinge shaft in which the first door is rotatably installed and a first cam portion for limiting an opening angle of the first door.

5. The refrigerator of claim 4, wherein the second stopper provided in the second hinge assembly contacts any one portion of the outer surface of the first cam portion provided in the first hinge assembly when the first door is rotated to reach the first door set angle.

6. The refrigerator of claim 4, wherein the first hinge assembly includes:

a fixing end fixed to the cabinet; and an extension end bent from the fixing end and positioned at the bottom of the first door and in which the first hinge shaft and the first cam portion are located.

7. The refrigerator of claim 6, wherein the fixing end is fastened and fixed to the front surface of the cabinet while being in contact with the front surface of the cabinet.

8. The refrigerator of claim 1, wherein the first stopper provided in the second door contacts any one portion of the outer surface of the second cam portion provided in the second hinge assembly when the second door is rotated to reach the second door set angle.

9. The refrigerator of claim 1, wherein the second cam portion of the second hinge assembly is formed to have a round surface rounded along a rotation direction of the second door around the second hinge shaft and a stopping surface protruding from the round surface to allow the first stopper to be caught.

10. The refrigerator of claim 9, wherein the first stopper is disposed to be caught by the stopping surface while being moved along the circumference of the round surface of the second cam portion during a rotation operation for opening the second door.

11. The refrigerator of claim 1, wherein the extension end is arranged parallel to and spaced apart from the bottom surface of the second door.

12. The refrigerator of claim 1, wherein the extension end is stepped from the coupling end so as to be arranged parallel to and spaced apart from the bottom surface of the second door.

* * * * *